United States Patent
Peters et al.

(10) Patent No.: US 12,546,755 B2
(45) Date of Patent: Feb. 10, 2026

(54) CHEMICAL AGENT DETECTOR WITH 30 SECOND CYCLE

(71) Applicant: MRIGlobal, Kansas City, MO (US)

(72) Inventors: Eric Peters, Prairie Village, KS (US); Louis Anderson, Bel Air, MD (US); Charmel Grisham, Grain Valley, MO (US); Sara Paalhar, Liberty, MO (US); Sylvanna Couch, Lenexa, KS (US)

(73) Assignee: MRIGLOBAL, Kansas City, MO (US)

( * ) Notice: Subject to any disclaimer, the term of this patent is extended or adjusted under 35 U.S.C. 154(b) by 0 days.

(21) Appl. No.: 17/072,714

(22) Filed: Oct. 16, 2020

(65) Prior Publication Data

US 2021/0116430 A1    Apr. 22, 2021

Related U.S. Application Data

(60) Provisional application No. 62/915,835, filed on Oct. 16, 2019.

(51) Int. Cl.
*G01N 30/74* (2006.01)
*G01N 30/02* (2006.01)
(Continued)

(52) U.S. Cl.
CPC .............. *G01N 30/74* (2013.01); *G01N 30/06* (2013.01); *G01N 30/54* (2013.01); *G01N 2030/025* (2013.01)

(58) Field of Classification Search
CPC ....... G01N 2030/025; G01N 2030/085; G01N 30/06; G01N 30/08; G01N 30/20; G01N 30/54; G01N 30/74; G01N 30/02; G01N 2030/022; G01N 2030/027; G01N 30/04; G01N 2030/201; G01N 2030/202; G01N 2030/407; G01N 30/46; G01N 30/44; G01N 30/461; G01N 30/463; G01N 30/465;
(Continued)

(56) References Cited

U.S. PATENT DOCUMENTS 5,162,652 A * 11/1992 Cohen .................. G01N 1/2214
                                                    250/288
7,401,498 B2 * 7/2008 Syage .................. G01N 27/626
                                                    73/28.01
(Continued)

FOREIGN PATENT DOCUMENTS

CN            2479504 Y  *  6/2001

OTHER PUBLICATIONS

University of Massachusetts Amherst, The Flame Photometric Detector (Year: 2016).*
(Continued)

*Primary Examiner* — John E Breene
*Assistant Examiner* — Truong D Phan
(74) *Attorney, Agent, or Firm* — Husch Blackwell LLP

(57) ABSTRACT

A gas chromatography instrument is provided that is capable of analyzing samples both quickly and accurately. The detector includes a first unit and a second unit that alternate between collection mode and desorption mode. This allows one unit to collect the sample, while the other unit desorbs another sample before the units switch operations. The alternating collection and desorption modes allows the detector to generate a data point approximately every thirty seconds, with each alternating unit.

20 Claims, 7 Drawing Sheets

(51) Int. Cl.
*G01N 30/06* (2006.01)
*G01N 30/54* (2006.01)

(58) Field of Classification Search
CPC .. G01N 30/466; G01N 30/467; G01N 30/468; G01N 30/68; G01N 2030/685; G01N 2030/385
USPC ............... 73/23.37, 23.2, 23.39, 23.4, 25.05
See application file for complete search history.

(56) References Cited

U.S. PATENT DOCUMENTS

| | | | | |
|---|---|---|---|---|
| 8,117,896 | B2* | 2/2012 | Lucas | G01N 30/08 73/23.41 |
| 10,113,983 | B1* | 10/2018 | Fine | G01N 1/2247 |
| 2008/0105036 | A1* | 5/2008 | Kendler | G01N 1/405 73/31.05 |
| 2014/0024129 | A1* | 1/2014 | Meyer | G01N 33/287 436/123 |
| 2015/0323430 | A1* | 11/2015 | Weling | G01N 33/0057 436/110 |
| 2017/0164878 | A1* | 6/2017 | Connor | A61B 5/053 |

OTHER PUBLICATIONS

Gracia, Sub-ppm gas sensor detection via spiral μ-preconcentrator, 2008 (Year: 2008).*

* cited by examiner

CHEMICAL AGENT DETECTOR WITH 30 SECOND CYCLE

CROSS-REFERENCE TO RELATED APPLICATIONS

This Application claims priority to U.S. Provisional Patent Application Ser. No. 62/915,835, filed on Oct. 16, 2019, entitled "Chemical Agent Detector with 30 Second Cycle," currently pending, the entire disclosure of which is incorporated herein by reference.

FIELD OF INVENTION

The present invention relates generally to air sampling devices or detectors used for gathering and analyzing trace elements from a particular environment such as a suspected contaminated area and, more particularly, to a gas chromatograph instrument capable of collecting air samples, desorbing the sample onto a gas chromatograph column to separate components, detecting the chemical(s) using a detector, and reporting the results every thirty seconds.

BACKGROUND OF INVENTION

There are many applications in which it is desirable to collect and capture air samples from an environment suspected of contamination. Examples include collecting air samples in potential hazardous chemical release situations, collecting vapor samples from bulk chemical storage locations, and the like. Many different types of sampling devices and detectors exist today for capturing samples of trace elements or contaminants from a particular environment. Once collected, such samples are analyzed to determine the nature of the chemicals involved, the level of contamination in the air, and the degree of risk personnel may be exposed to in the contaminated area.

One method of analyzing collected air samples is through gas-liquid chromatography, commonly referred to as gas chromatography. Gas chromatography is a process used for analyzing a complex sample by separating the analytes within the sample to determine the identity of the analytes in the sample. Other information about the analytes, such as the concentration of each analyte within the sample, may also be obtained. A gas chromatograph is used for separating the sample by injecting the sample onto a column through which the sample passes.

The column temperature, column length, vapor pressure, polarity of components compared to the polarity of the stationary phase on the column, carrier gas flow rate, and amount of material injected determines the time of retention and the quality of separation. Thus, the time for a sample to be analyzed and the accuracy of the analyzation are dependent on each other. Generally, a high column temperature results in a short retention time but also a poor separation. However, users may need a sample analyzed both quickly and accurately, such as when process monitoring or for air safety monitoring.

It is therefore desirable to provide a gas chromatography instrument capable of analyzing samples both quickly and accurately.

SUMMARY OF INVENTION

The present invention overcomes many of the shortcomings and limitations of the prior art devices discussed above. The invention described includes several embodiments of air sampling devices used for gas chromatography, and it is capable of reporting the results every thirty seconds.

In one embodiment, the detector includes a first unit and a second unit. The first unit and the second unit work in conjunction with each other, such that the first unit may be in a collection mode while the second unit is in a desorption mode. In collection mode, a sample moves through a heated sample line until the sample reaches a pre-concentrator tube. In a preferred embodiment, the pre-concentrator tube is a curved cylinder, with a C-like shape and is made out of metal or a metal-like material. This pre-concentrator tube may contain a two (2) cm bed-depth of a collection sorbent which is specific for the material being collected.

The first unit then switches from collection mode to its desorption mode, while the second unit switches from the desorption mode to the collection mode. When the first unit is in its desorption mode, the carrier gas flows through the sorbent contained in the pre-concentrator tube. A current runs through the metal or metal-like pre-concentrator tube to assist in heating the pre-concentrator tube (as well as the solvents and sample within the pre-concentrator tube). Once the sample within the pre-concentrator tube is heated, the sample is desorbed. The desorbed sample flows to the main column, which separates any compounds or interferences, thus creating a response through at least one flame photometric detector.

Thus, the first unit and second unit alternate between collection mode and desorption mode, allowing one unit to collect the sample, while the other unit desorbs another sample. The units can then switch. The alternating collection and desorption modes allow the pre-concentrator tube to heat and cool within approximately thirty seconds. The detector is therefore able to generate a data point approximately every thirty seconds, with each alternating unit.

These and other aspects and advantages of the present invention will become apparent to those skilled in the art after considering the following detailed description in connection with the accompanying drawings.

DETAILED DESCRIPTION

Figure 1:
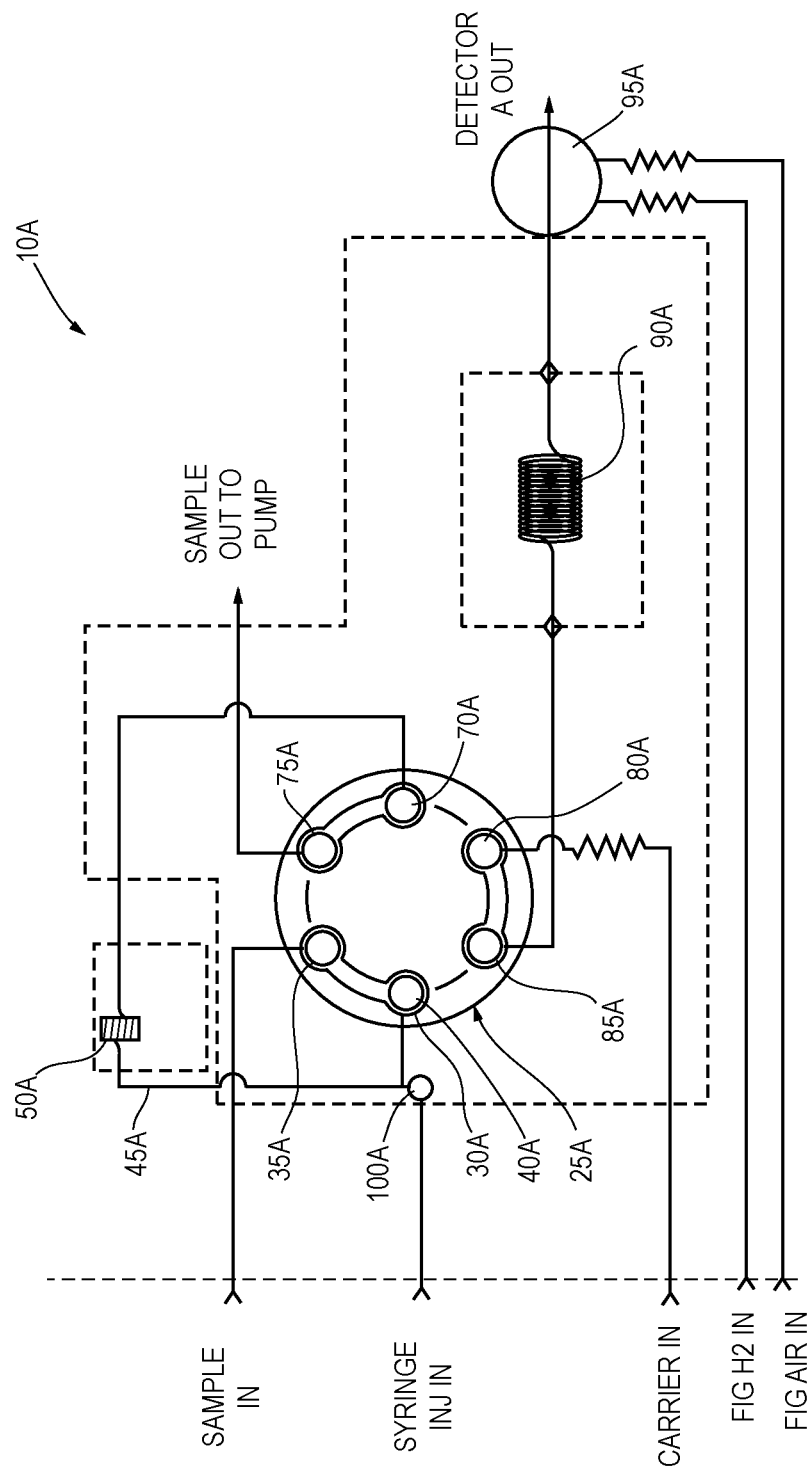
FIG. 1 is a schematic representation of a first unit in a collection mode.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Figure 2:
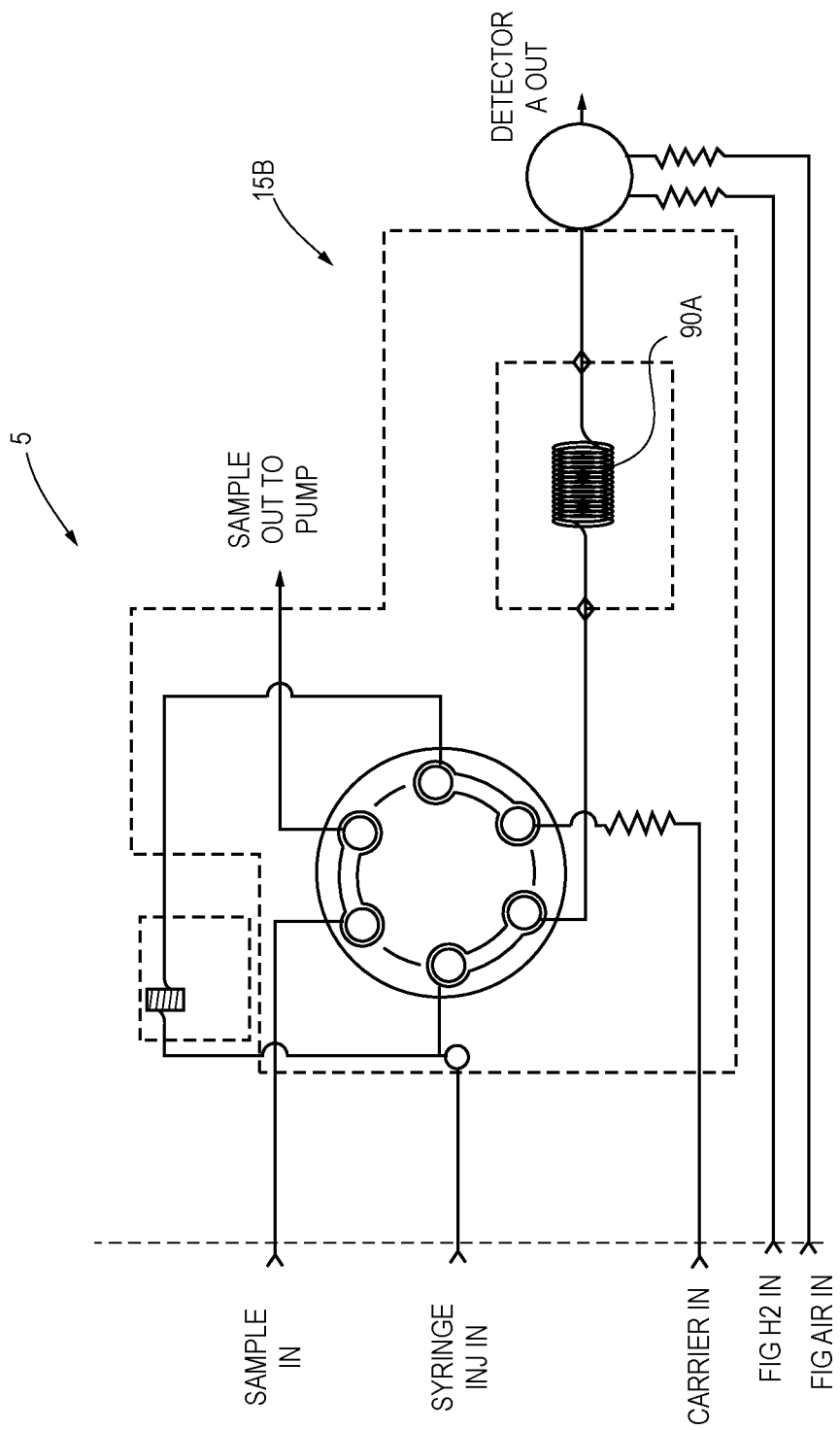
FIG. 2 is a schematic representation of a second unit in a desorption mode.

Turning to FIGS. 1 and 2, in a first embodiment of a device 5, the device 5 includes a first unit 10 and a second unit 15. The first unit 10 and second unit 15 may be located in separate housings, or may be located together within a single housing. The components within the first unit 10 and second unit 15 may be substantially similar. For the purposes hereof, when referencing a component of both units 10, 15, a reference number will be used. However, when referring specifically to a component of the first unit 10, the reference number will be appended with the letter "A," while the reference number of a component of the second unit 15 will be appended with the letter "B." The first unit 10 and the second unit 15 work in conjunction with each other, such that when the first unit 10 is in a collection mode, the second unit 15 is in a desorption mode. The second unit 15 can then switch to the collection mode, while the first unit 10 then switches to the desorption mode, which will be explained in greater detail hereinafter.

As illustrated in FIG. 1, each unit 10, 15 includes at least one switching valve 25. In one embodiment, the switching valve 25 may include a stationary body section (not illustrated) and a rotating valve core (not illustrated). The stationary body section may be a circular component with a cavity extending downwards from the top of the stationary body section. The cavity is shaped and sized so that the rotating valve core may be inserted into the cavity of the stationary body section. The rotating valve core (rotor) may therefore rotate within the stationary body section, between a first position and a second position, as will be explained in more detail below. Other types of valves and arrangements thereof could also be used in alternative embodiments.

The stationary body section of the switching valve 25 further includes a series of ports, including a first port 30. In one embodiment, the switching valve 25 may include six ports (30, 35, 70, 75, 80, 85). The switching valve 25 may include more or fewer ports 30 in alternative embodiments. Each port 30 extends through the stationary body section, from a stationary body sidewall, though the stationary body section, and to the cavity, adjacent to the rotating valve core. The rotating valve core includes at least one groove allowing at least two ports to be in fluid communication with each other.

In one embodiment, when either unit 10, 15 is in collection mode, a sample can be drawn in through an inlet associated with a first port 35 of the six ports within the switching valve 25. The sample can then move from the first port 35 to the sixth port 40, where it exits the switching valve 25. The sample then moves through a heated sample line 45 until the sample reaches a pre-concentrator tube 50.

Figure 3:
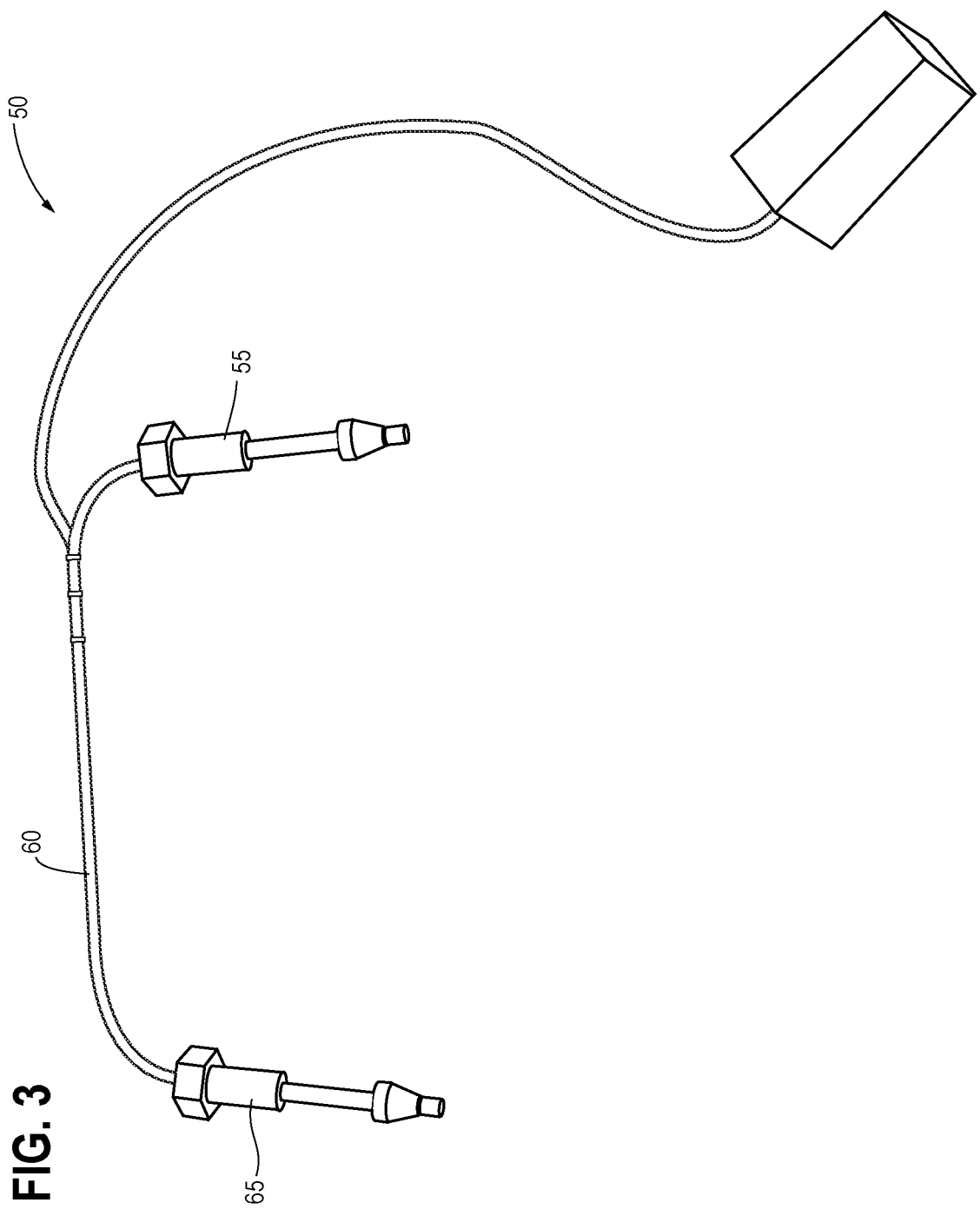
FIG. 3 is a perspective view of one embodiment of a pre-concentrator tube constructed in accordance with the teachings of the present invention and a prior art pre-concentrator tube.

In a preferred embodiment, the pre-concentrator tube 50 is a curved cylinder, as shown in FIG. 3. In more detail, the pre-concentrator tube 50 may include a first pre-concentrator tube section 55, a second pre-concentrator tube section 60, and a third pre-concentrator tube section 65. The first pre-concentrator tube section 55 is preferably adjacent to and abutting the second pre-concentrator tube section 60, while the second pre-concentrator tube section 60 is adjacent to and abutting both the first pre-concentrator tube section 55 and the third pre-concentrator tube section 65. The second pre-concentrator tube section 60 is also preferably substantially perpendicular to both the first pre-concentrator tube section 55 and the third pre-concentrator tube section 65. The pre-concentrator tube 50 is therefore a C-like shape or a U-like shape. The pre-concentrator tube section 55, 60, and 65 are preferably hollow cylindrical members or tubing, and are preferably made out of metal or metal-like material which conduct electricity.

In one embodiment, the length of the pre-concentrator tube 50 may range from 4.9 to 5 inches, with a 0.0625 inch outer diameter and a 0.040 inch inner diameter. The pre-concentrator tube 50 may have other lengths and diameter in alternative embodiments. The design and materials of the pre-concentrator tube 50 allow for fast heating and cooling (e.g., in less than 30 seconds). Heating may occur with heating elements, or by running an electrical current directly through the metal of the pre-concentrator tube 50, or via other known techniques. Cooling may occur by blowing ambient air across the pre-concentrator tube 50, or by other known techniques.

Turning back to FIG. 1, from pre-concentrator tube 50, the remaining sample is drawn back to a third port 70 of port switch valve 25, and out through a second port 75. It may then be exhausted.

As the sample flows into either unit 10, 15 from the first port 35 to the pre-concentrator tube 50, carrier gas is supplied from a vessel (not shown) and enters the unit 10 through a fourth port 80 before exiting the switching valve 25 through the fifth port 85. A non-inclusive list of possible carrier gasses includes helium, nitrogen, and hydrogen. The carrier gas continues to flow from a fifth port valve 85 into a main column 90. In this orientation, the carrier gas may help to cleanse the main column 90.

Figure 4:
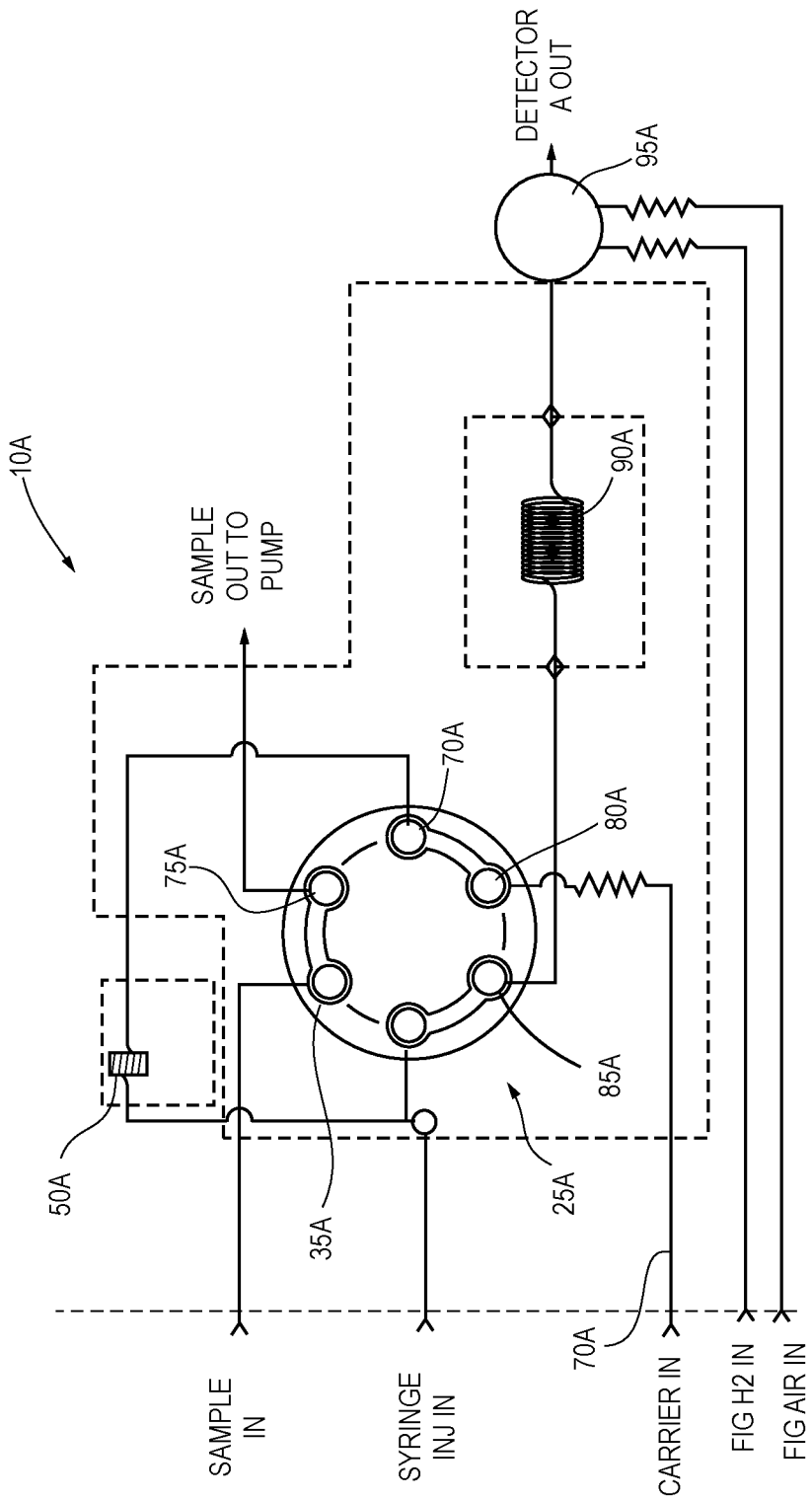
FIG. 4 is a schematic representation of the first unit of FIG. 1 in the desorption mode.
Figure 5:
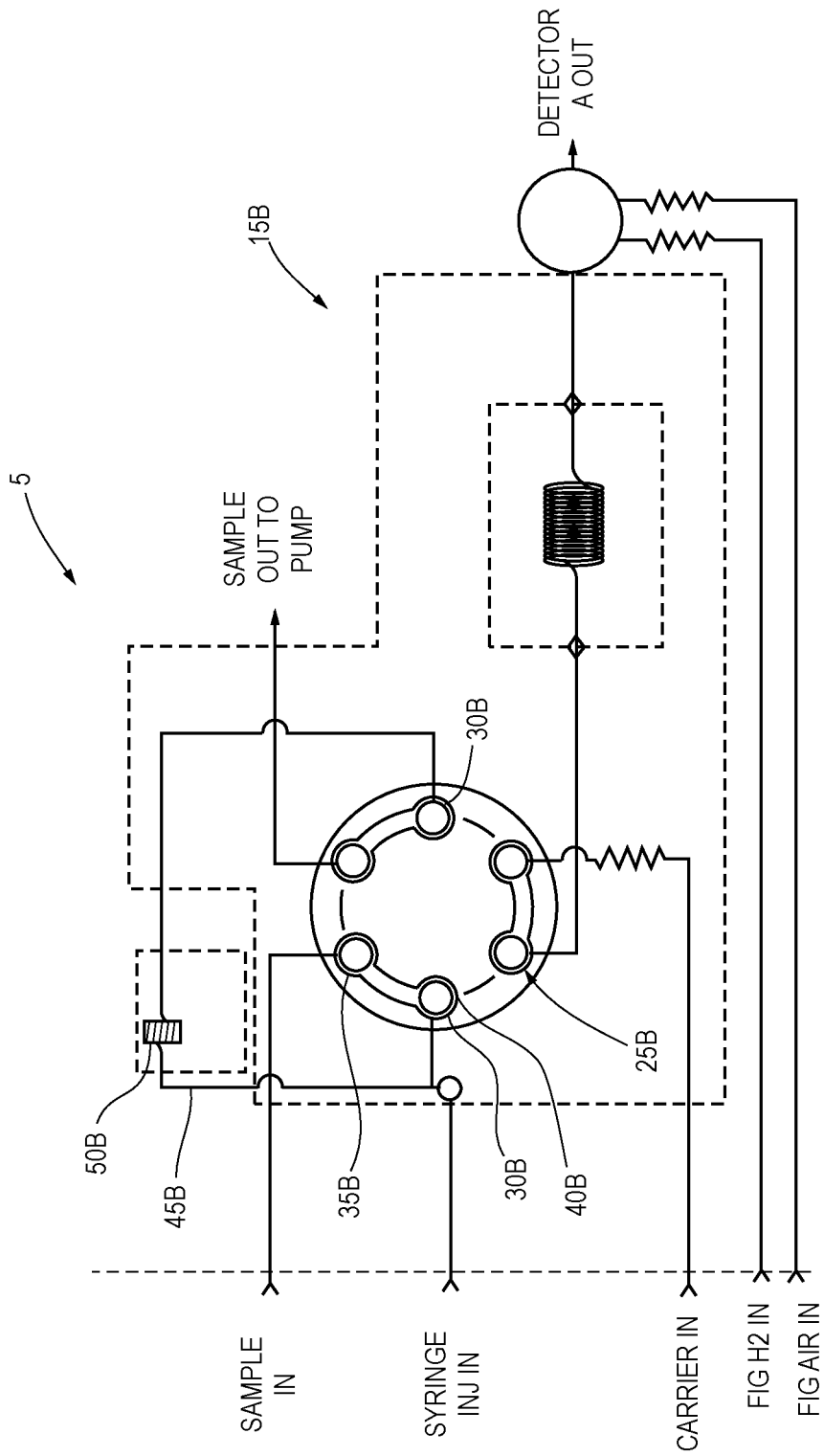
FIG. 5 is a schematic representation of the second unit of FIG. 2 in a collection mode.

When a unit 10, 15 switches from the collection mode to a desorption mode, as illustrated in FIGS. 1 and 4, the other unit 15, 10 switches from the desorption mode to the collection mode, as illustrated in FIGS. 2 and 5. When the units 10, 15 switch modes (from the collection mode to the desorption mode or vice versa), the rotating valve core rotates within the stationary body section from a first position to a second position so that the port valves within the port switch valve 25 are in fluid communication with at least one different port valve. When the unit 10 is in the desorption mode, illustrated in FIG. 4, the carrier gas still enters the port switch valve 25 through the fourth port valve 80. But instead of the carrier gas exiting through the fifth port valve 85 and going to the main column 90, the carrier gas exits through the third port 70 and flows to the pre-concentrator tube 50 in a reverse direction as when the sample has collected.

As the rotating valve core is switched to the second position to put a unit 10, 15 in to desorption mode, a current is run through the metal or metal-like pre-concentrator tube 50 to assist in quickly heating the pre-concentrator tube 50 (as well as the solvents and collected chemical sample within the pre-concentrator tube 50). As the sample within the pre-concentrator tube 50 is heated, the sample is desorbed. The sample is pushed from the pre-concentrator tube 50 by carrier gas flow from a pressurized gas cylinder (not illustrated), and re-enters the port switch valve 25 through the sixth port valve 40. The sample then exits the port switch valve 25 through the fifth port valve 85 before flowing to the main column 90. The main column 85 separates compounds or interferences creating a response through at least one flame photometric detector 95. The device can further measure a mass per unit volume for the desired output of the instrument.

For example, while the unit 10 is in its desorption mode as shown in FIG. 2, unit 15 is in its collection mode as illustrated in FIG. 5. The collection mode of unit 15 is essentially identical to the collection mode of unit 10.

Thus, unit 10 and unit 15 alternate between collection mode and desorption mode, allowing one unit to collect the sample, while the other unit desorbs the sample. The alternating collection and desorption modes allow the pre-concentrator tube 50 to heat and cool within approximately thirty seconds. The device 5 is therefore able to generate a data point approximately every thirty seconds, with each alternating unit 10 or 15 generating a data point approximately every minute.

Additional features of the device 5 may include each unit 10 and 15 of the detector being further able to sample or take in the sample at the desired interval of time within the thirty second window. For example, the units 10 and 15 may be designed or programmed to sample at ten seconds, at twenty seconds, or at thirty seconds within the thirty second window.

In one embodiment, an injection port 100 may be positioned between the sixth port 40 and the pre-concentrator tube 50 in the pre-concentrator line 45. Thus, when a unit 10, 15 is in desorption mode, a sample can be directly injected into the sixth port 40. The sample would then exit through the fifth port 85 and proceed directly to the main column 90. This allows direct testing of the main column 90 and flame photometric detector 95. In such a test, no sample is collected by the pre-concentrator tube 50 immediately preceding the desorption mode test.

Alternatively, or in addition once the main column 90 and flame photometric detector 95 have been tested, the sample injection port 100 can be used to test the collection capabilities of the pre-concentrator tube 50 when the unit 10, 15 is in collection mode. A known sample can be injected at the injection port 100, where it flows directly to the pre-concentrator tube 50. The system can then switch to the desorption mode, where the collected sample is run through the main column 90 and flame photometric detector 95. The collection abilities of the pre-concentrator tube 50 can be determined, due to the known characteristics of the direct-injected sample.

Figure 6:
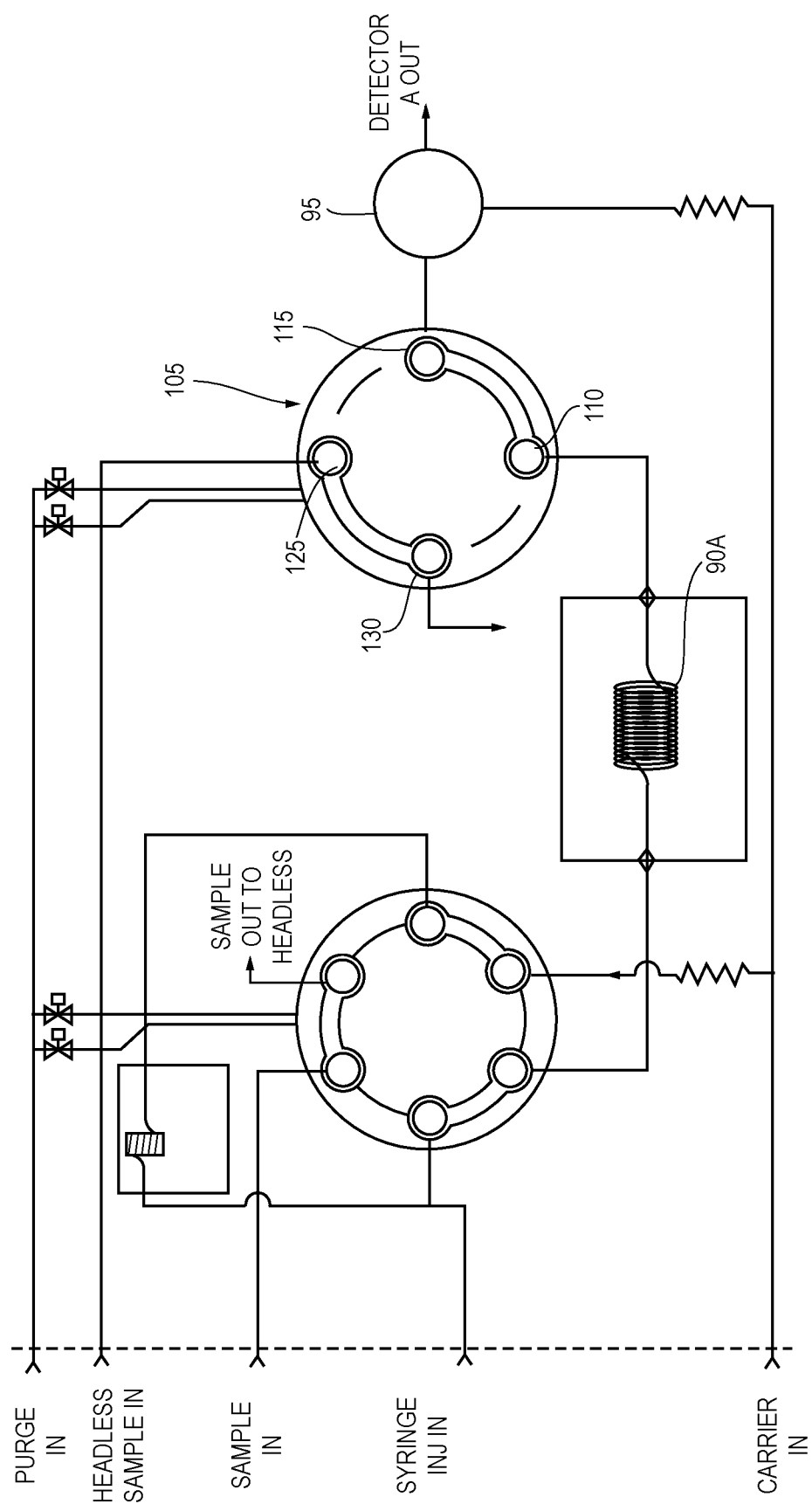
FIG. 6 is a schematic representation of another embodiment of a detector in the collection mode.
Figure 7:
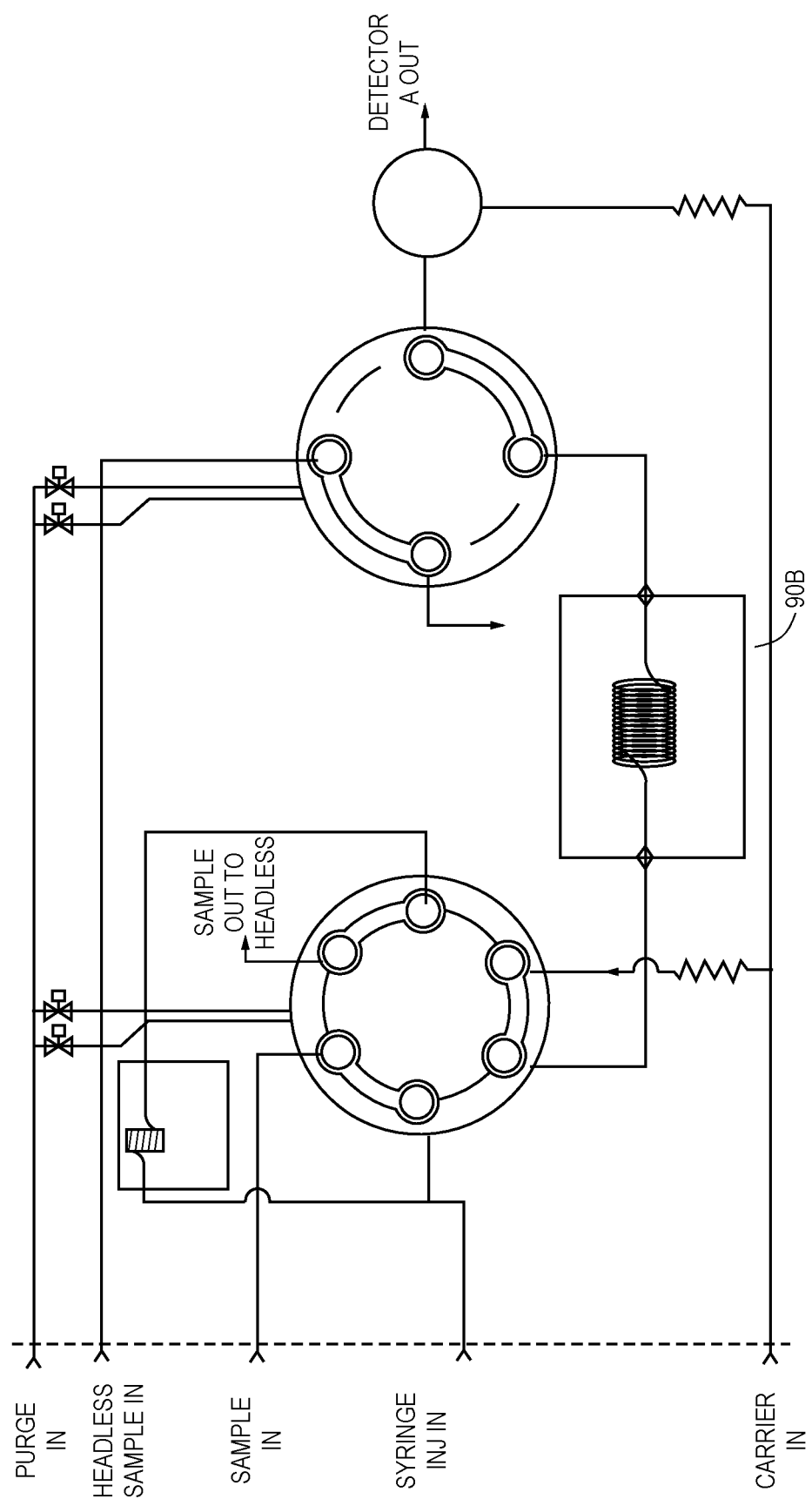
FIG. 7 is a schematic representation of the shared detector of FIG. 6 in the desorption mode.

In yet another embodiment, illustrated in FIGS. 6 and 7, the device 5 may include an additional four port valve 105 and only one flame photometric detector 95. The four-port valve 105 allows both units 10 and 15 to use the same flame photometric detector 95, as the units 10 and 15 switch between the collection and desorption modes. As illustrated in FIG. 6, when unit 10 is in its desorption mode, the desorbed sample are carried to the main column 90A, after which they pass into a third port 110 and out of a fourth port 115 of the four-port switching valve 105. The fourth port 115 of the four-port valve 105 may be connected with the single flame photometric detector 95. In this configuration, the second unit 15 outputs its sample-less carrier gas from its main column 90B to the first port 125 of the four-port valve 105, which exits via the second port 130 to vent.

However, when the second unit 15 switches to desorption mode, in addition to the above-discussed switches of its six-port valve 25B, the four port valve 105 switches so that the first port 125 is connected with the fourth port 115, and that the sample from the second unit 15 is fed to the single flame photometric detector 95. The third port 110 of the fourth port 105 is then connected with the second port 130, such that the sample-less carrier flow of the first unit 10 is vented.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

The invention claimed is:

1. An air sampling device comprising:
a first unit and a second unit each comprising at least a respective one of the following:
a port switch valve,
a sample inlet in fluid communication with a first port of the port switch valve,
a cylindrical pre-concentrator tube curved in a C-shape, the pre-concentrator tube containing a sorbent, the pre-concentrator tube formed from a material capable of conducting electricity, a first end of the pre-concentrator tube in fluid communication with a sixth port of the port switch valve, and a second end of the pre-concentrator tube in fluid communication with a third port of the port switch valve,
an exhaust line in fluid communication with a second port of the port switch valve,
a carrier inlet in fluid communication with a fourth port of the port switch valve,
a main column in fluid communication with a fifth port of the port switch valve, and
a flame photometric detector in fluid communication with the main column,
wherein the first unit and the second unit each have a first and second configuration,
wherein the first unit is in the first configuration when the second unit is in the second configuration, and vice versa,
wherein in the first configuration, the first port is in fluid communication with the sixth port, the second port is in fluid communication with the third port, and the fourth port is in fluid communication with the fifth port,
wherein in the second configuration, the first port is in fluid communication with the second port, the third port is in fluid communication with the fourth port, and the fifth port is in fluid communication with the sixth port,
wherein the first unit and the second unit each are capable of alternating between a collection mode in the first configuration and desorption mode in the second configuration, the first and second unit each completing one cycle every sixty seconds or less such that one of the first unit and second unit generates a data point every thirty seconds or less.

2. The air sampling device of claim 1, wherein the port switch valve of the first unit includes a plurality of ports.

3. The air sampling device of claim 2, wherein when the first unit is in the collection mode, the plurality of ports are in a first configuration, and wherein when the first unit is in the desorption mode, the plurality of ports are in a second configuration.

4. The air sampling device of claim 2, wherein when the first unit is in the collection mode, a carrier gas may be provided to the main column via two or more of the plurality of ports.

5. The air sampling device of claim 1, wherein the port switch valve of the second unit includes a plurality of ports.

6. The air sampling device of claim 5, wherein when the second unit is in the collection mode, the plurality of ports are in a first configuration, and wherein when the second first unit is in the desorption mode, the plurality of ports are in a second configuration.

7. The air sampling device of claim 5, wherein when the second unit is in the collection mode, a carrier gas may be provided to the main column via two or more of the plurality of ports.

8. The air sampling device of claim 1, wherein the first and second units are located within a single housing.

9. The air sampling device of claim 1, wherein when the first unit is in the desorption mode, a sample provided in the pre-concentrator tube is heated.

10. The air sampling device of claim 1, wherein when the second unit is in the desorption mode, a sample provided in the pre-concentrator tube is heated.

11. An air sampling device comprising:
a first unit and a second unit,
the first unit and the second unit each being capable of alternating between a collection mode and desorption mode, each unit being in an opposite mode from the other, and the first and second unit working in conjunction with each other so that the device generates a data point in thirty seconds or less;
wherein the first and second unit each include a respective cylindrical pre-concentrator tube curved in a C-shape, the pre-concentrator tube containing a sorbent, the pre-concentrator tube formed from a material capable of conducting electricity.

12. The air sampling device of claim 11, wherein the first unit comprises:
a port switch valve;
a main column; and
a flame photometric detector; and the second unit comprises:
a port switch valve;
a main column; and
a flame photometric detector.

13. The air sampling device of claim 12, wherein the port switch valve of the first unit includes a plurality of ports.

14. The air sampling device of claim 13, wherein when the first unit is in the collection mode, the plurality of ports are in a first configuration, and wherein when the first unit is in the desorption mode, the plurality of ports are in a second configuration.

15. The air sampling device of claim 13, wherein when the first unit is in the collection mode, a carrier gas may be provided to the main column via two or more of the plurality of ports.

16. The air sampling device of claim 12, wherein the port switch valve of the second unit includes a plurality of ports.

17. The air sampling device of claim 16, wherein when the second unit is in the collection mode, the plurality of ports are in a first configuration, and wherein when the second first unit is in the desorption mode, the plurality of ports are in a second configuration.

18. The air sampling device of claim 16, wherein when the second unit is in the collection mode, a carrier gas may be provided to the main column via two or more of the plurality of ports.

19. The air sampling device of claim 12, wherein when the first unit is in the desorption mode, a sample provided in the pre-concentrator tube is heated.

20. The air sampling device of claim 12, wherein when the second unit is in the desorption mode, a sample provided in the pre-concentrator tube is heated.

* * * * *